Feb. 9, 1937.  V. W. KLIESRATH  2,069,764
SPRING SUSPENSION
Filed Nov. 9, 1933

INVENTOR.
Victor W. Kliesrath
BY
ATTORNEY.

Patented Feb. 9, 1937

2,069,764

UNITED STATES PATENT OFFICE 2,069,764

SPRING SUSPENSION

Victor W. Kliesrath, South Bend, Ind., assignor to The Steel Wheel Corporation, Chicago, Ill., a corporation of New York Application November 9, 1933, Serial No. 697,280

12 Claims. (Cl. 267—19)

This invention relates to spring suspensions, and is illustrated as embodied in an individual suspension for an automobile wheel. An object of the invention is to provide a very flexible yielding support for the vehicle, while at the same time providing a very rigid support for bracing the wheel against side thrusts and other shocks, preferably in an individual spring suspension carrying a single wheel independently of the other wheels.

In one desirable arrangement, the wheel is rotatably carried by means at the outer ends of a pair of arms, shown parallel to the wheel axis and arranged spaced vertically one above the other. According to an important feature of the invention one of these arms is rigid and is arranged to take the side thrusts and other shocks, and the other one is a short laminated leaf spring, or is otherwise formed of spring material, and takes the vehicle load. The rigid arm is preferable Y-shaped, having at its base parts spaced apart longitudinally of the vehicle, the better to brace the wheel against shocks and thrusts.

I prefer to mount the inner ends or bases of the two arms in resilient sockets or supports of rubber or rubber material, and in one arrangement the desired distribution of the load is facilitated by making the rubber material supporting the rigid arm much softer than that supporting the spring arm.

Figure 1:
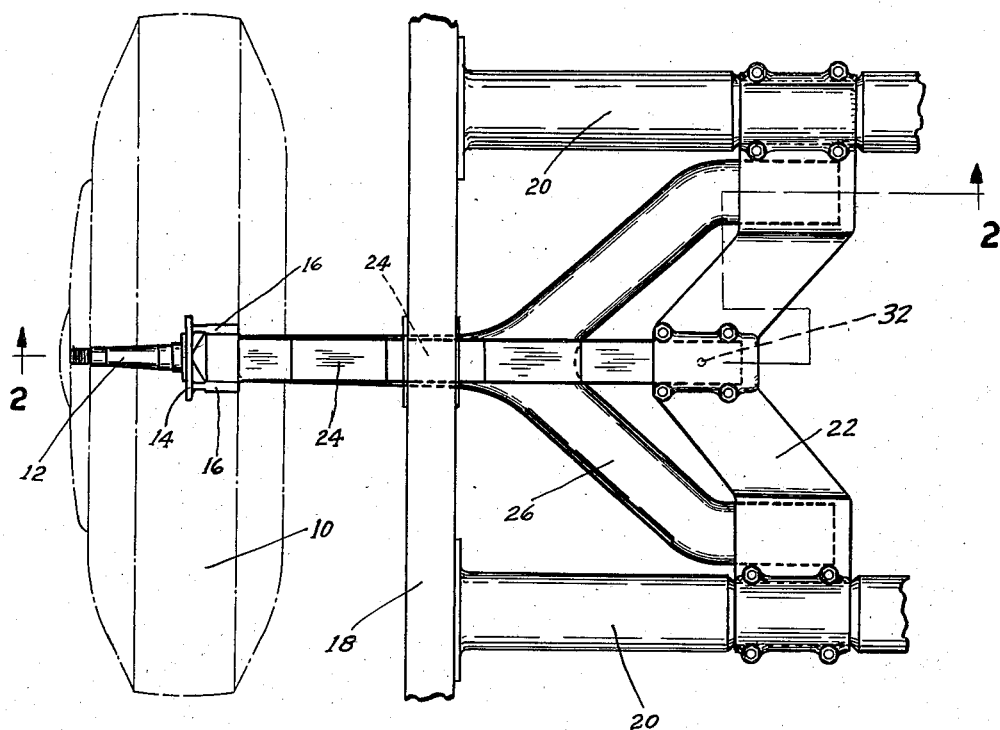
Figure 2:
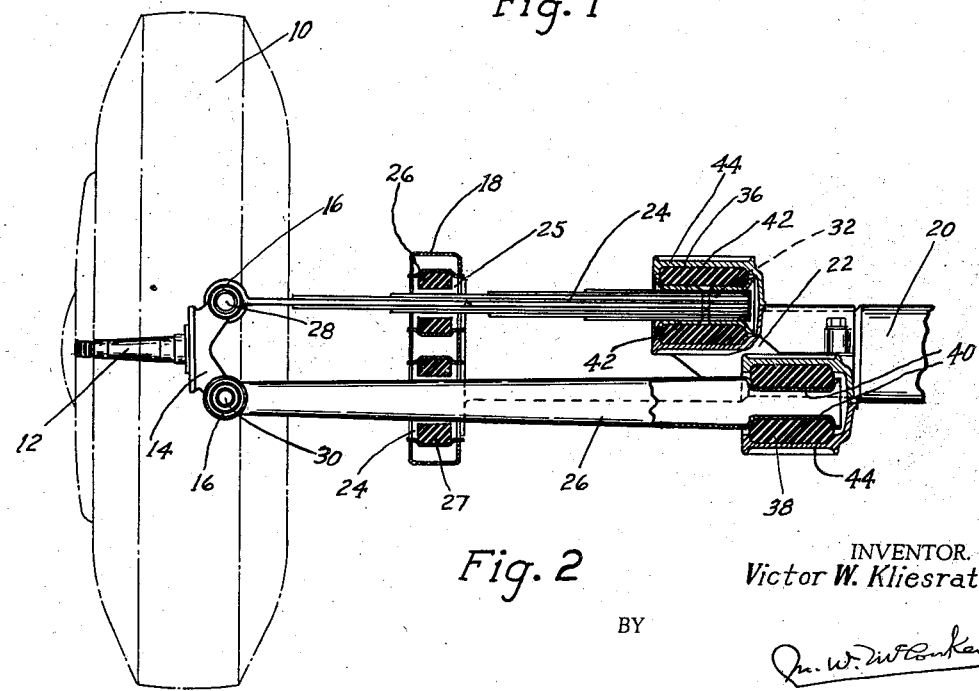

The above and other objects and features of the invention, including various novel combinations of parts and desirable particular constructions, will be apparent from the following description of the illustrative embodiment shown in the accompanying drawing, in which:

Figure 1 is a top plan view of the left rear wheel of an automobile, and its associated spring suspension and supporting parts; and Figure 2 is a section there-through on the line 2—2 of Figure 1.

The illustrated construction includes a streamlined rubber-tired wheel 10 rotatably mounted on a spindle 12 carried by a vertical support 14 having at its upper and lower ends alined pairs of eyes 16. The wheel, with three other similar wheels the front two of which are swiveled, supports a chassis comprising (at the rear end, which is illustrated) side members 18 rigidly connected by a pair of tubular cross pieces 20. The cross members 20 carry a spring bracket 22 which bridges across them. The spring suspension members extend through openings 25 in the side members 18, and which openings preferably have rubber bumpers 27 preventing excessive vertical movement.

The general arrangement described above is more fully described, and is broadly claimed in my prior applications Nos. 651,821, 651,822, 677,612, and 679,473, filed respectively January 14, 1933, January 14, 1933, June 26, 1933, and July 8, 1933. It is not my intention to claim in the present application any subject-matter claimed in said prior applications.

The wheel-carrying member 14 is shown supported by upper and lower arms 24 and 26, paralleling the axis of the wheel, and having at their outer ends eyes sleeved on and vulcanized to rubber bushings which in turn are sleeved on and vulcanized to pins 28 and 30 secured at their ends in the eyes 16.

The upper arm 24 is substantially straight, and is resilient for the purpose of yieldingly carrying the major part of the load, being shown as a laminated leaf spring with the center and strongest leaf extending for the length of the arm and with the upper and lower leaves progressively shorter in length. The inner ends of the leaves are all alined, and may be secured together by a rivet or other fastening 32.

The lower arm 26, which serves to brace the wheel but which does not normally transmit to the wheel any considerable part of the vehicle load, is rigid, being if desired formed as described in the above-mentioned application No. 651,821 by welding together face to face two channel-shaped stampings. In order to give the maximum bracing effect, this arm is Y-shaped in plan view, it being forked so that its base or inner end comprises two parts spaced apart a considerable distance longitudinally of the vehicle.

The inner or base end of the spring 24, and the inner ends of the spaced base parts of arm 26, are seated in upper and lower rubber sockets 36 and 38 embracing them at their ends. These may either be pairs of blocks of rubber material embracing the ends of the arms, or rubber sleeves mounted thereon and having their upper and lower portions of substantial thickness. The rubber blocks 38 are seated in sockets 40 formed in the upper and lower faces of the ends of the spaced inner parts of arm 26.

The blocks 36 are shown seated in stamped sockets 42 secured to the base of the spring arm 24 by means such as the rivet 32. The blocks are held in sockets in the bracket 22 by caps or the like 44 bolted to the bracket. Similar caps secure the ends of the bracket 22 to the cross pieces 20.

I prefer that the rubber blocks 38 be of much softer material than blocks 36, to insure that the major part of the load is transmitted to the wheel by the spring arm 24, although some of the advantages of the invention can be secured without this additional feature.

While one illustrative embodiment is described in detail, it is not my intention to limit the scope of the invention to that particular embodiment, or otherwise than by the terms of the appended claims.

I claim:

1. A spring suspension for a wheel comprising an arm of resilient spring material, a seat of relatively stiff rubber material yieldingly holding the base of said arm, a Y-shaped rigid arm having spaced base parts, seats of softer rubber material holding said spaced parts, and means carried by the outer ends of said arms and rotatably supporting the wheel.

2. A spring suspension for a wheel comprising an arm of resilient spring material, a seat of relatively stiff rubber material yieldingly holding the base of said arm, a rigid arm vertically spaced from the first arm, softer rubber material holding the base of the rigid arm, and means carried by the outer ends of said arms and rotatably supporting the wheel.

3. A spring suspension for a wheel comprising vertically-spaced arms having means at their outer ends for rotatably supporting a wheel, one of said arms being rigid and the other in the form of a resilient spring, and rubber seats for the inner ends of said arms, the rubber of the seat for the rigid arm being more resilient than the rubber of the seat for the spring arm.

4. A spring suspension for a wheel comprising vertically-spaced arms having means at their outer ends for rotatably supporting a wheel, one of said arms being rigid and the other in the form of a resilient spring, and rubber seats for the inner ends of said arms yieldingly opposing movement thereof.

5. A spring suspension for a wheel comprising upper and lower arms paralleling the wheel axis and having means at their outer ends for rotatably supporting the wheel, one of said arms being of resilient spring material and transmitting the vehicle load to the wheel and the other arm being rigid and holding the wheel against shocks directed against it, and yielding means movably holding the inner ends of said arms and resisting movement of the spring arm to a considerably greater degree than movement of the rigid arm.

6. A spring suspension for a wheel comprising upper and lower arms paralleling the wheel axis and having means at their outer ends for rotatably supporting the wheel, one of said arms being of resilient spring material and transmitting the vehicle load to the wheel and the other arm being rigid and holding the wheel against shocks directed against it, and yielding means movably holding the inner ends of said arms and yieldingly opposing movement thereof.

7. A spring suspension for a wheel comprising upper and lower arms paralleling the wheel axis and having means at their outer ends for rotatably supporting the wheel, one of said arms being of resilient spring material and transmitting the vehicle load to the wheel and the other arm being rigid and holding the wheel against shocks directed against it together with yielding means holding the inner ends of said arms and resisting movement of one arm more than the other.

8. A spring suspension for a wheel comprising upper and lower arms paralleling the wheel axis and having means at their outer ends for rotatably supporting the wheel, one of said arms being substantially straight and of resilient spring material and transmitting the vehicle load to the wheel and the other arm being rigid and having inner vehicle-supporting parts spaced longitudinally of the vehicle and holding the wheel against shocks directed against it, and yielding means movably holding the inner ends of said arms and resisting movement of the spring arm to a considerably greater degree than movement of the rigid arm.

9. A spring suspension for a wheel comprising upper and lower arms paralleling the wheel axis and having means at their outer ends for rotatably supporting the wheel, one of said arms being substantially straight and of resilient spring material and transmitting the vehicle load to the wheel and the other arm being rigid and having inner vehicle-supporting parts spaced longitudinally of the vehicle and holding the wheel against shocks directed against it, and yielding means movably holding the inner ends of said arms and yieldingly opposing movement thereof.

10. A spring suspension for a wheel comprising upper and lower arms paralleling the wheel axis and having means at their outer ends for rotatably supporting the wheel, one of said arms being substantially straight and of resilient spring material and transmitting the vehicle load to the wheel and the other arm being rigid and having inner vehicle-supporting parts spaced longitudinally of the vehicle and holding the wheel against shocks directed against it together with yielding means holding the inner ends of said arms and resisting movement of one arm more than the other.

11. A spring suspension for supporting a chassis on a wheel comprising a pair of vertically spaced arms having means at their outer ends for rotatably supporting a wheel, one of said arms being rigid and the other in the form of a spring, and blocks of yielding material mounting the inner end of the rigid arm for yieldably opposing movements thereof, said spring and said blocks cooperating yieldingly to support said chassis.

12. A spring suspension for a wheel comprising a pair of vertically spaced arms having means at their outer ends for rotatably supporting a wheel, one of said arms being rigid and the other in the form of a spring, and rubber blocks engaging the upper and lower surfaces of the inner end of the rigid arm for yieldingly opposing pivotal movement thereof in a vertical plane.

VICTOR W. KLIESRATH.